(12) United States Patent
Zhi et al.

(10) Patent No.: US 10,439,464 B2
(45) Date of Patent: Oct. 8, 2019

(54) MOTOR AND METHOD OF MANUFACTURING MOTOR

(71) Applicant: FANUC CORPORATION, Yamanashi (JP)

(72) Inventors: Chao Zhi, Yamanashi (JP); Yohei Kamiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 90 days.

(21) Appl. No.: 15/890,029

(22) Filed: Feb. 6, 2018

(65) Prior Publication Data
US 2018/0241275 A1 Aug. 23, 2018

(30) Foreign Application Priority Data
Feb. 23, 2017 (JP) .................................. 2017-032099

(51) Int. Cl.
*H02K 7/08* (2006.01)
*H02K 5/16* (2006.01)
(Continued)

(52) U.S. Cl.
CPC ........... *H02K 5/161* (2013.01); *F16C 35/067* (2013.01); *H02K 5/1732* (2013.01); *H02K 7/083* (2013.01);
(Continued)

(58) Field of Classification Search
CPC ........... H02K 5/16; H02K 5/173; H02K 7/08; H02K 7/083; H02K 5/161; H02K 5/1732;
(Continued)

(56) References Cited

U.S. PATENT DOCUMENTS 5,228,787 A * 7/1993 Lawson .................. F16B 21/20
384/535
5,264,748 A * 11/1993 Ootsuka .................. F16C 17/04
310/90

(Continued)

FOREIGN PATENT DOCUMENTS

CN 1921265 A 2/2007
JP S62-064151 U 4/1987
(Continued)

OTHER PUBLICATIONS

An Office Action; "Notification of Reasons for Refusal," issued by the Japanese Patent Office dated Jun. 5, 2018, which corresponds to Japanese Patent Application No. 2017-032099 and is related to U.S. Appl. No. 15/890,029; with partial English language translation.
An Office Action mailed by the State Intellectual Property Office of the People's Republic of China dated Feb. 19, 2019, which corresponds to Chinese Patent Application No. 201810141418.2 and is related to U.S. Appl. No. 15/890,029; with English translation.

* cited by examiner

*Primary Examiner* — Naishadh N Desai
(74) *Attorney, Agent, or Firm* — Studebaker & Brackett PC

(57) ABSTRACT

A motor includes a rotor including a shaft and a rotor body, a bearing fitted to the shaft and rotatably holding the shaft, a bearing holder arranged on the opposite side to the rotor body so as to hold the bearing, a movement regulation member arranged closer to the rotor body than the bearing and separated to regulate movement of the bearing toward the rotor body, a first engagement part provided at the rotor body to be adjacent to the movement regulation member, a first engagement target part provided at the movement regulation member to be adjacent to the rotor body to be able to be engaged with the first engagement target part, a second engagement part provided at the movement regulation member, a second engagement target part provided at the bearing holder, and a coupling member that couples the bearing holder and the movement regulation member.

5 Claims, 9 Drawing Sheets

(51) Int. Cl.
*F16C 35/067* (2006.01)
*H02K 5/173* (2006.01)
*F16C 19/06* (2006.01)
*F16C 35/04* (2006.01)

(52) U.S. Cl.
CPC ............ *F16C 19/06* (2013.01); *F16C 35/042* (2013.01); *F16C 2380/26* (2013.01)

(58) Field of Classification Search
CPC ...... F16C 35/063; F16C 35/12; F16C 35/067; F16C 2226/12; F16C 19/06; F16C 2380/26; F16C 35/042
USPC ...................................................... 310/89–91
See application file for complete search history.

(56) References Cited

U.S. PATENT DOCUMENTS

| | | | | | |
|---|---|---|---|---|---|
| 5,269,607 | A | * | 12/1993 | Lawson | ............... F16B 21/20 384/538 |
| 5,322,373 | A | * | 6/1994 | Oakes | ............... F16C 33/664 384/462 |
| 2007/0096572 | A1 | * | 5/2007 | Watkins | ............... F16C 27/04 310/90 |

FOREIGN PATENT DOCUMENTS

| | | |
|---|---|---|
| JP | S63-138852 U | 9/1988 |
| JP | H02-094453 U | 7/1990 |
| JP | H07-227057 A | 8/1995 |
| SU | 462249 A1 | 2/1975 |

MOTOR AND METHOD OF MANUFACTURING MOTOR

This application is based on and claims the benefit of priority from Japanese Patent Application No. 2017-032099, filed on 23 Feb. 2017, the content of which is incorporated herein by reference.

BACKGROUND OF THE INVENTION

Field of the Invention

The present invention relates to a motor and a method of manufacturing the motor.

Related Art

A motor has conventionally been configured so as to reduce the occurrence of creep by placing a bearing for rotatably holding a rotor at a flange (a part of a housing) and then pressing the bearing against the flange by fixing a bearing plate to the flange with a screw.

A motor has conventionally been assembled by the following procedure, for example. First, as shown in FIG. 6A, a bearing 140 is housed and arranged in a flange 121 of a housing 120. Then, a bearing plate 130 is arranged on the opposite side to the flange 121 with respect to the bearing 140, and the bearing plate 130 is coupled to the flange 121 with multiple screws (not shown in the drawings). By doing so, the bearing 140 is fixed to the flange 121 to reduce the occurrence of creep. Aligning a screw hole in the bearing plate 130 and a screw hole in the flange 121 requires fine position adjustment, so that operation for such positioning has been done manually.

Next, as shown in FIG. 6B, a rotor 110 is inserted into the housing 120. More specifically, a shaft 112 of the rotor 110 is inserted (press fitted) with a press machine operated from outside, for example, into the bearing 140 fixed to the housing 120 (arrow F10). Then, a bearing 160 is inserted so as to pass a shaft 113 of the rotor 110 on the opposite side (a shaft extending toward the opposite side to the shaft 112) through the bearing 160. Further, as shown in FIG. 6C, a bearing plate 139 is attached (arrow F11). In this way, the motor 100 is assembled.

In the above-described steps of assembling the conventional motor 100, however, the screw hole in the bearing plate 130 and the screw hole in the flange 121 are required to be aligned to cause complication in the assembly process. Further, the press machine is required for inserting the shaft 112 of the rotor 110 into the bearing 140 and the bearing plate 130 fixed to the flange 121. Additionally, an orbital plane on the bearing might be subjected to application of high load during the pressing.

In this regard, a technique using a bearing having an outer race with a cutout has been disclosed as means for reducing the occurrence of creep (see patent document 1, for example).

Patent Document 1: Japanese Unexamined Patent Application, Publication No. H07-227057

SUMMARY OF THE INVENTION

The technique disclosed in patent document 1 involves change in the shape of the outer race of the bearing. This reduces versatility seriously and increases cost for manufacturing the bearing to cause a problem in terms of increasing cost for manufacturing a motor as a whole.

As described above, the following problems have occurred in steps of assembling a motor: a screw hole in a bearing plate and a screw hole in a flange are required to be aligned; a press machine is required for inserting a shaft of a rotor into a bearing and the bearing plate fixed to the flange; and high load is applied to an orbital plane on the bearing during insertion of the shaft with the press machine.

The present invention is intended to provide a motor with high manufacturability and a method of manufacturing the motor.

(1) The present invention relates to a motor (motor 1 described later, for example) including:

a rotor (rotor 10 described later, for example) which includes a shaft (front shaft 12 described later, for example) arranged to extend in an axis direction (axis direction Y described later, for example) and a rotor body (rotor body 11 described later, for example) coupled to the shaft, wherein the rotor is rotatable about the axis direction;

a bearing (front bearing 40 described later, for example) fitted to the shaft from outside and rotatably holding the shaft;

a bearing holder (front flange 21 described later, for example) arranged on the opposite side to the rotor body with respect to the bearing and holding the bearing;

a movement regulation member (front bearing plate 30 described later, for example) arranged closer to the rotor body than the bearing and separated from the rotor body, the movement regulation member regulating movement of the bearing toward the rotor body;

a first engagement part (first engagement part 15 described later, for example) provided at the rotor body to be adjacent to the movement regulation member;

a first engagement target part (first engagement target part 32 described later, for example) provided at the movement regulation member to be adjacent to the rotor body, wherein the first engagement part can be engaged with the first engagement target part, and the first engagement target part can be separated from the first engagement part in the axis direction;

a second engagement part (second engagement part 34 described later, for example) provided at the movement regulation member to be adjacent to the bearing holder;

a second engagement target part (second engagement target part 27 described later, for example) provided at the bearing holder to be adjacent to the movement regulation member and engaging with the second engagement part; and a coupling member (coupling member 50 described later, for example) that couples the bearing holder and the movement regulation member.

(2) In the motor according to the above (1), when the movement regulation member is not coupled to the bearing holder with the coupling member, and the second engagement part is not engaged with the second engagement target part, the movement regulation member may be rotatable about the axis direction and movable in the axis direction, and when the rotor body rotates about the axis direction while the first engagement part is engaged with the first engagement target part, the movement regulation member may rotate about the axis direction by the rotation of the rotor body to allow the second engagement part to move to a position for engagement with the second engagement target part.

(3) In the motor according to the above (1) or (2), the first engagement part may be a projection projecting in the axis direction, the first engagement target part may be a recess recessed in the axis direction or a through part penetrating in the axis direction, the second engagement part may be a projection projecting in the axis direction, and the second engagement target part may be a recess recessed in the axis direction.

(4) In the motor according to any one of (1) to (3), the bearing holder may include a first coupling hole (first coupling hole 28 described later, for example), and the movement regulation member may include a second coupling hole (second bearing hole 36 described later, for example) that is in communication with the first coupling hole when the second engagement part is engaged with the second engagement target part, and the coupling member may be inserted into the first coupling hole and the second coupling hole which are in communication with each other.

(5) The present invention relates to a method of manufacturing the motor according to any one of (1) to (4). The method includes:

a first insertion step of inserting the shaft into the movement regulation member and the bearing;

a second insertion step of inserting, into the bearing holder, the shaft which has been inserted into the movement regulation member and the bearing;

a first rotation step of rotating the rotor body about the axis direction to move the first engagement part to a position corresponding to the first engagement target part;

a first engagement step of causing the first engagement part to be engaged with the first engagement target part;

a second rotation step of rotating the rotor body about the axis direction while the first engagement part is engaged with the first engagement target part to rotate the movement regulation member about the axis direction, thereby moving the second engagement part to a position corresponding to the second engagement target part; and a second engagement step of disengaging the first engagement part and the first engagement target part from each other, and causing the second engagement part to be engaged with the second engagement target part.

The present invention is capable of providing a motor with high manufacturability and a method of manufacturing the motor.

DETAILED DESCRIPTION OF THE INVENTION

Figure 1:
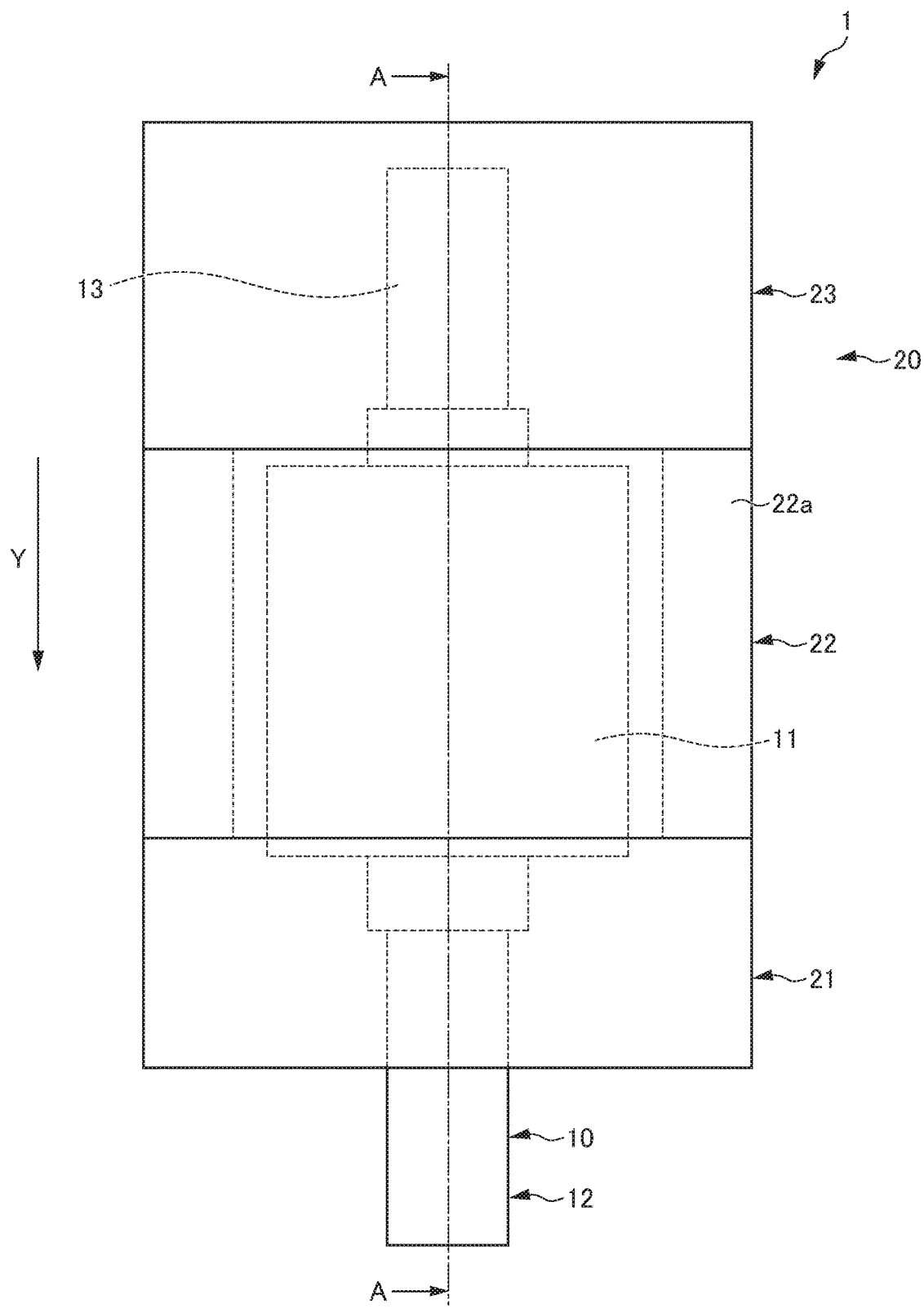
FIG. 1 is a front view of a motor according to an embodiment.
Figure 2:
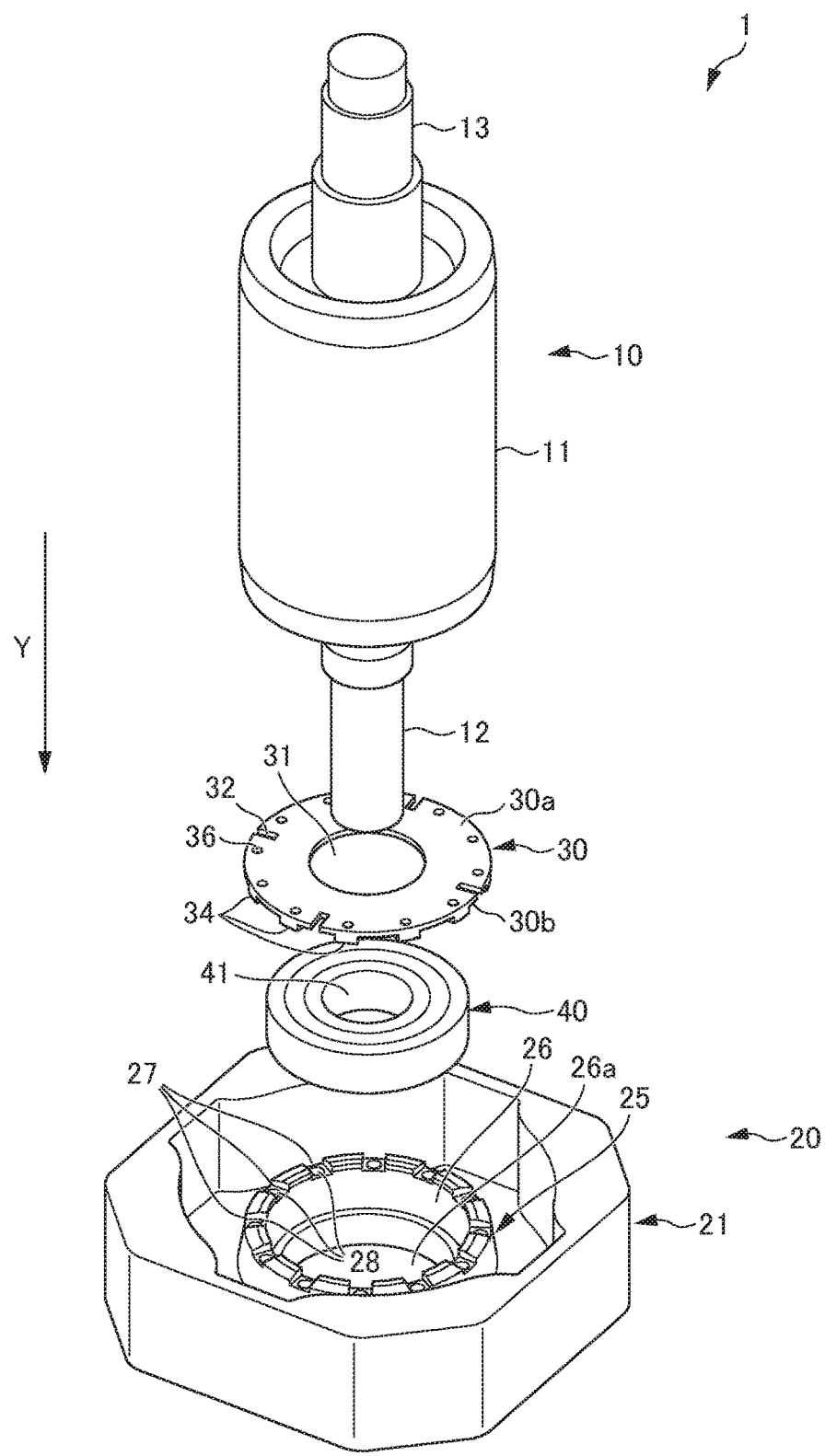
FIG. 2 is an expanded perspective view of the motor according to the embodiment.
Figure 3:
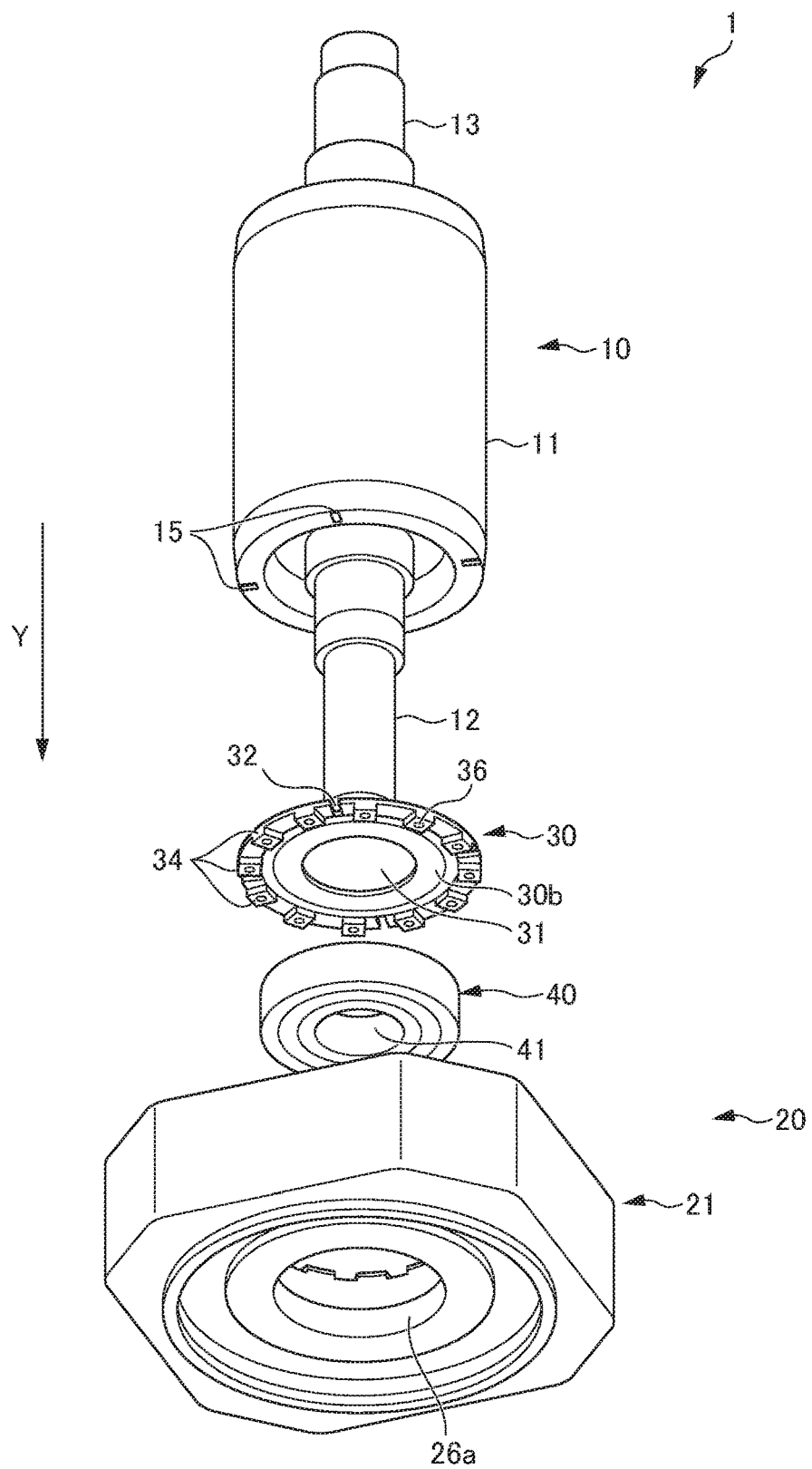
FIG. 3 is an expanded perspective view of the motor according to the embodiment taken from a different direction.
Figure 4:
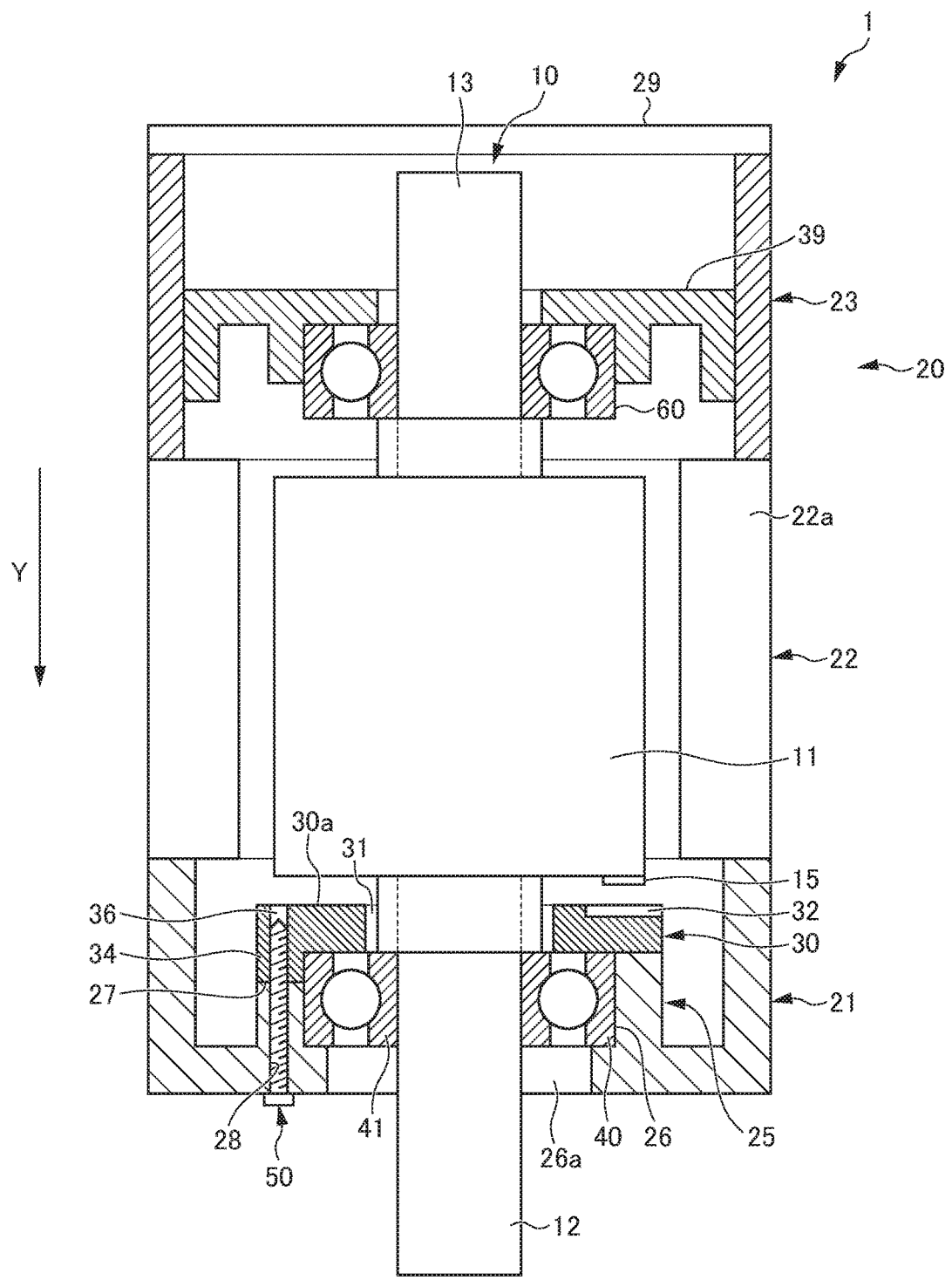
FIG. 4 is a sectional view taken along a line A-A of FIG. 1.

An embodiment of the present invention will be described below by referring to the drawings. The configuration of a motor 1 of the embodiment will be described first by referring to FIG. 1 to 4. FIG. 1 is a front view of a motor according to the embodiment. FIG. 2 is an expanded perspective view of the motor according to the embodiment. FIG. 3 is an expanded perspective view of the motor according to the embodiment taken from a different direction. FIG. 4 is a sectional view taken along a line A-A of FIG. 1.

As shown in FIGS. 1 to 4, the motor 1 includes a rotor 10, a housing 20, a front bearing plate 30 (movement regulation member), a rear bearing plate 39, a front bearing 40 (bearing), multiple coupling members 50, and a rear bearing 60. The motor 1 of this embodiment is a rotary motor in which a rotor and a stator work cooperatively to generate power. More specifically, the motor 1 of this embodiment is an interior permanent magnet (IPM) motor having a configuration with a permanent magnet buried inside a rotor. The type described in this embodiment is not the only type of the motor 1.

The rotor 10 includes a front shaft 12 (shaft) arranged to extend in an axis direction Y, a rear shaft 13 arranged to extend in the axis direction Y, and a rotor body 11 coupled to the front shaft 12 and the rear shaft 13. The rotor 10 is a member to rotate about the axis direction Y. The rotor 10 is held in the housing 20 so as to become rotatable about the axis direction Y by the front bearing 40 and the rear bearing 60. The front shaft 12 is an output side shaft.

The rotor body 11 is a circular cylindrical rotor core having a configuration with multiple stacked magnetic steel sheets, for example. The rotor body 11 is a part to be rotated by a rotating magnetic field generated by a stator 22a described later.

The rotor body 11 includes multiple (in this embodiment, four) first engagement parts 15 projecting in the axis direction Y provided at positions adjacent to the bearing plate 30 (adjacent to the front shaft 12 and adjacent to the front bearing 40). The first engagement part 15 will be described later.

The front shaft 12 is a shaft member coupled to one end of the rotor body 11 in the axis direction Y. The front shaft 12 is inserted into the front bearing plate 30 and the front bearing 40. In the process of manufacturing the motor 1, the front shaft 12 is inserted into the front bearing plate 30 and the front bearing 40 while the front bearing plate 30 and the front bearing 40 are not fixed to a front flange 21 (bearing holder) described later. The front shaft 12 is held so as to become rotatable about the axis direction Y by the front bearing 40.

The rear shaft 13 is a shaft member coupled to the opposite end of the rotor body 11 in the axis direction Y. The rear shaft 13 is inserted into the rear bearing plate 39 and the rear bearing 60. The rear shaft 13 is held so as to become rotatable about the axis direction Y by the rear bearing 60.

The housing 20 includes the front flange 21 (bearing holder), a housing body 22, and a rear flange 23. The housing 20 houses the rotor body 11, a part of the front shaft 12, and a part of the rear shaft 13 of the rotor 10, the front bearing 40, the front bearing plate 30, the rear bearing 60, and the rear bearing plate 39. The housing 20 includes the stator 22a inside the housing 20.

The front flange 21 is arranged on the opposite side to the rotor body 11 with respect to the front bearing 40. The front flange 21 includes a front bearing holder body 25 with a front bearing housing 26, and a front shaft passage part 26a. The front flange 21 (front bearing holder body 25) holds the front bearing 40 housed in the front bearing housing 26. More specifically, the front flange 21 (front bearing holder body 25) holds the front bearing 40 housed in the front bearing housing 26 and pressed against the bottom surface of the front bearing housing 26 by the front bearing plate 30.

The front flange 21 includes multiple (in this embodiment, 12) second engagement target parts 27 provided at the front bearing holder body 25 to be adjacent to the front bearing plate 30 and recessed in the axis direction Y. A first coupling hole 28 is provided at a position corresponding to each of the multiple second engagement target parts 27 at the front bearing holder body 25. Multiple (in this embodiment, 12) second engagement parts 34 (described later) are provided at the front bearing plate 30 and engage with corresponding ones of the multiple second engagement target parts 27. The sectional view of FIG. 4 virtually shows the second engagement part 34, the second engagement target part 27, the first coupling hole 28, and the coupling member 50 on the left side, and shows the first engagement part 15 and a first engagement target part 32 (described later) on the right side.

The housing body 22 is arranged at a central area of the housing 20 in the axis direction Y. The housing body 22 includes the stator 22a inside the housing body 22. The stator 22a includes a cylindrical stator core having a configuration with multiple stacked magnetic steel sheets, and a stator winding attached to the stator core. The stator core is fixedly attached to the inner peripheral surface of the housing body 22. The stator core has an inner peripheral surface with multiple slots formed at equal intervals and extending in the axis direction Y. The stator winding is arranged in the slots. The stator 22a generates a rotating magnetic field for rotating the rotor body 11 about the axis direction Y.

The rear flange 23 is arranged at an end portion in the axis direction Y opposite the front flange 21. The rear flange 23 and the rear bearing plate 39 together hold the rear bearing 60.

The front bearing plate 30 (movement regulation member) is a plate member of an annular shape. The front bearing plate 30 includes a passage hole 31 provided at a central area of the annular shape.

The front bearing plate 30 is arranged closer to the rotor body 11 than the front bearing 40. The front bearing plate 30 is arranged between the front bearing 40 and the rotor body 11. The front bearing plate 30 is separated from the rotor body 11 in the axis direction Y (see FIG. 4).

The front bearing plate 30 is coupled (fixed) to the front flange 21 with the multiple (in this embodiment, 12) coupling members 50. The front bearing plate 30 regulates movement of the front bearing 40 toward the rotor body 11. The front bearing plate 30 presses the front bearing 40 against the front flange 21 (the bottom surface of the front bearing housing 26).

The front bearing plate 30 includes multiple (in this embodiment, four) first engagement target parts 32 formed at a first surface 30a of the front bearing plate 30 adjacent to the rotor body 11. In this embodiment, the first engagement target part 32 is a recess recessed in the axis direction Y. The first engagement target part 32 is provided so as to allow engagement of the first engagement part 15 with the first engagement target part 32 and is separated from the first engagement part 15 in the axis direction Y.

The front bearing plate 30 includes multiple (in this embodiment, 12) second engagement parts 34 formed at a second surface 30b of the front bearing plate 30 adjacent to the front flange 21 and projecting in the axis direction Y. The multiple second engagement parts 34 engage with corresponding ones of the multiple second engagement target parts 27 provided at the front flange 21 (front bearing holder body 25).

The front bearing plate 30 includes multiple (in this embodiment, 12) second coupling holes 36. The multiple second coupling holes 36 are holes to communicate with corresponding ones of the multiple first coupling holes 28 in the axis direction Y while the multiple second engagement parts 34 engage with corresponding ones of the multiple second engagement target parts 27. In this embodiment, the second coupling hole 36 is provided in the second engagement part 34. The coupling member 50 is inserted into each of the multiple first coupling holes 28 and a corresponding one of the multiple second coupling holes 36 communicating with each other. In this way, the front bearing plate 30 is coupled to the front flange 21.

While the front bearing plate 30 is not coupled to the front flange 21 with the multiple coupling members 50 and the multiple second engagement parts 34 do not engage with the multiple second engagement target parts 27, the front bearing plate 30 is rotatable about the axis direction Y and movable in the axis direction Y. Specifically, during manufacturing process before the front bearing plate 30 is coupled and fixed to the front flange 21, the front bearing plate 30 is rotatable about the axis direction Y and movable in the axis direction Y.

The front bearing plate 30 is configured in such a manner that, if the rotor body 11 (rotor 10) rotates about the axis direction Y while the multiple first engagement parts 15 engage with the multiple first engagement target parts 32, the front bearing plate 30 rotates about the axis direction Y by the rotation of the rotor body 11 to allow the multiple second engagement parts 34 to move to positions for engagement with the multiple second engagement target parts 27. Specifically, the front bearing plate 30 allows alignment between the second engagement part 34 and the second engagement target part 27 in response to rotation of the rotor body 11 about the axis direction Y during the manufacturing process. Further, the front bearing plate 30 moves in the axis direction Y under its own weight, for example, during the manufacturing process to allow engagement of the second engagement part 34 with the second engagement target part 27. In this way, the first coupling hole 28 and the second coupling hole 36 communicate with each other.

The front bearing 40 (bearing) is fitted to the front shaft 12 from outside to rotatably hold the front shaft 12. The front bearing 40 includes an inner race 41 with a passage part for insertion of the front shaft 12. The front bearing 40 is housed and arranged in the front bearing housing 26 at the front flange 21. Movement of the front bearing 40 in the axis direction Y is regulated by the front bearing plate 30 coupled to the front flange 21. The front bearing 40 is pressed against the bottom surface of the front bearing housing 26 by the front bearing plate 30. In this way, the front bearing 40 is attached to the front flange 21 with reduced occurrence of creep.

The above-described first engagement part 15, first engagement target part 32, second engagement part 34, second engagement target part 27, first coupling hole 28, and second coupling hole 36 will be summarized as follows. The first engagement part 15 is provided at the rotor body 11 to be adjacent to the front bearing plate 30. In this embodiment, the first engagement part 15 is a projection projecting in the axis direction Y. The first engagement part 15 is engaged with the first engagement target part 32 to transmit rotation of the rotor body 11 about the axis direction Y to the front bearing plate 30. The first engagement part 15 is a part to be used during the process of manufacturing the motor 1 and not to be used after the process of manufacturing the motor 1. In the motor 1 in a finished state, the first engagement part 15 is not engaged with the first engagement target part 32 and is separated from the front bearing plate 30 in the axis direction Y.

The first engagement target part 32 is provided at the front bearing plate 30 to be adjacent to the rotor body 11 and allows engagement of the first engagement part 15 with the first engagement target part 32. The first engagement target part 32 is separated from the first engagement part 15 in the axis direction Y. In this embodiment, the first engagement target part 32 is a recess recessed in the axis direction Y and extends in the radial direction of the front bearing plate 30 to reach the outer edge of the front bearing plate 30. The first engagement target part 32 is engaged with the first engagement part 15 to transmit rotation of the rotor body 11 about the axis direction Y to the front bearing plate 30. The first engagement target part 32 is a part to be used during the process of manufacturing the motor 1 and not to be used after the process of manufacturing the motor 1. In the motor 1 in a finished state, the first engagement target part 32 is not engaged with the first engagement part 15 and is separated from the rotor body 11 in the axis direction Y.

The second engagement part 34 is provided at the front bearing plate 30 to be adjacent to the front flange 21. In this embodiment, the second engagement part 34 is a projection projecting in the axis direction Y. The second coupling hole 36 is provided in the second engagement part 34. In response to rotation of the front bearing plate 30 about the axis direction Y, the second engagement part 34 moves to a position corresponding to the second engagement target part 27. Further, the second engagement part 34 moves in the axis direction Y toward the front flange 21 under its own weight, for example, to engage with the second engagement target part 27. While the second engagement part 34 is engaged with the second engagement target part 27, the first coupling hole 28 and the second coupling hole 36 are adjusted in position to communicate with each other.

The second engagement target part 27 is provided at the front flange 21 to be adjacent to the front bearing plate 30 The second engagement target part 27 is engaged with the second engagement part 34. In this embodiment, the second engagement target part 27 is a recess recessed in the axis direction Y and extends in the radial direction of the front flange 21 to reach the outer edge of the front flange 21. The second engagement target part 27 is engaged with the second engagement part 34. While the second engagement part 34 is engaged with the second engagement target part 27, the first coupling hole 28 and the second coupling hole 36 are adjusted in position to communicate with each other.

The first coupling hole 28 is provided at a position where the second engagement target part 27 of the front bearing holder body 25 of the front flange 21 is arranged. More specifically, the first coupling hole 28 is provided in such a manner that an opening of the first coupling hole 28 at one end thereof is exposed at the bottom surface of the second engagement target part 27. An opening of the first coupling hole 28 at the opposite end thereof is exposed at an outer surface of the front flange 21 as an external side in the axis direction Y. While the second engagement part 34 is engaged with the second engagement target part 27, the first coupling hole 28 communicates with the second coupling hole 36 in the axis direction Y.

The second coupling hole 36 is provided in the front bearing plate 30. The second coupling hole 36 is provided in the second engagement part 34. More specifically, the second coupling hole 36 is provided in such a manner that an opening of the second coupling hole 36 at one end thereof is exposed at a projecting surface of the second engagement part 34. An opening of the second coupling hole 36 at the opposite end thereof is exposed at an outer side of the first surface 30a of the front bearing plate 30 adjacent to the rotor body 11. While the second engagement part 34 is engaged with the second engagement target part 27, the second coupling hole 36 communicates with the first coupling hole 26 in the axis direction Y.

The coupling member 50 is arranged by being inserted into the first coupling hole 28 and the second coupling hole 36 communicating with each other to couple the front flange 21 and the front bearing plate 30. In this embodiment, the coupling member 50 is formed of a male screw. A female screw corresponding to the male screw is formed in the second coupling hole 36.

Figure 5A:
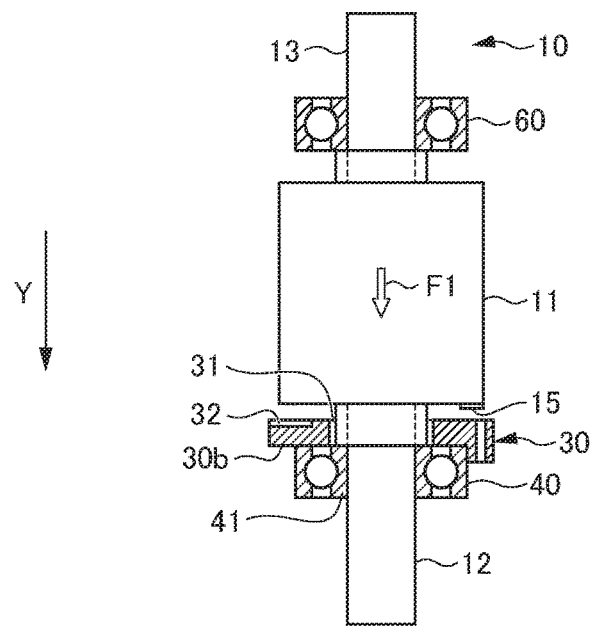
FIG. 5A illustrates a first insertion step.
Figure 5B:
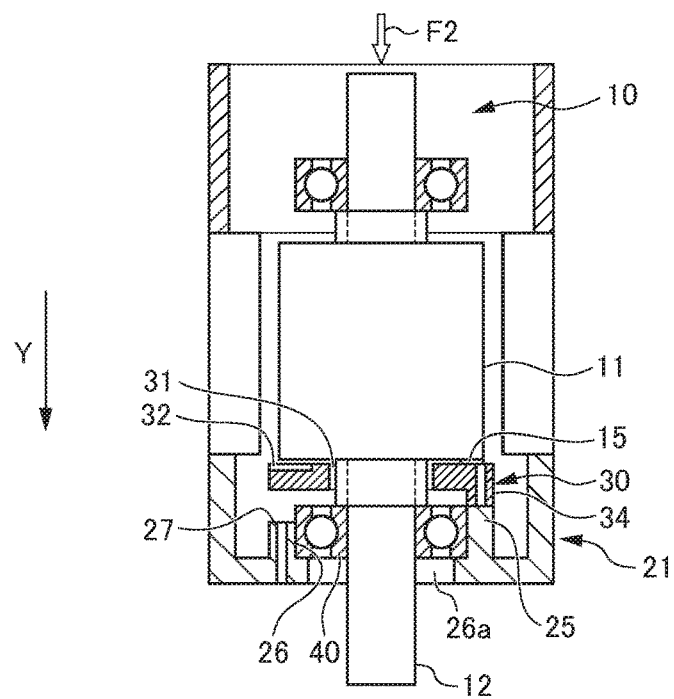
FIG. 5B illustrates a second insertion step.
Figure 5C:
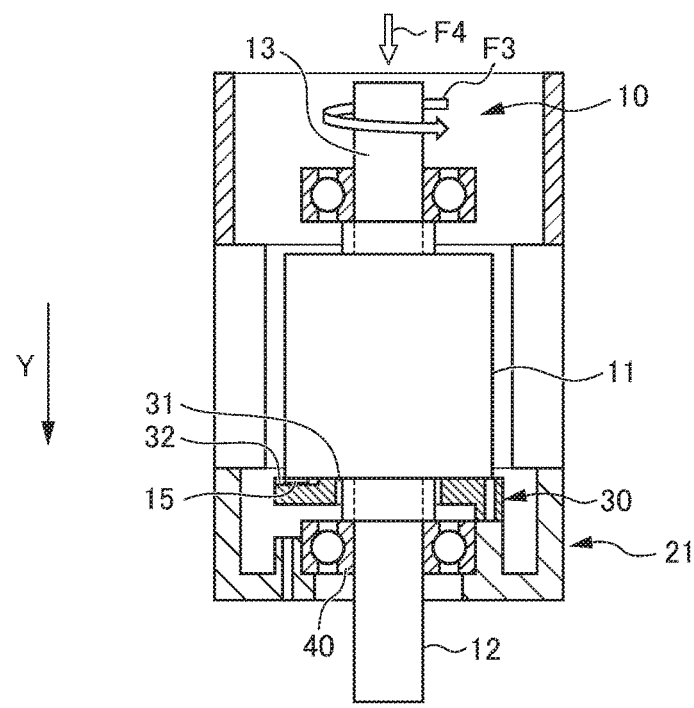
FIG. 5C illustrates a first rotation step and a first engagement step.
Figure 5D:
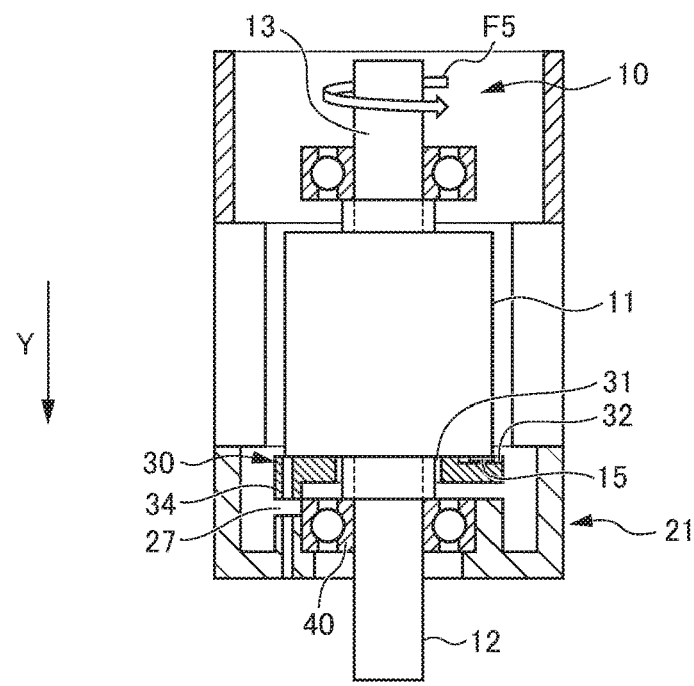
FIG. 5D illustrates a second rotation step.
Figure 5E:
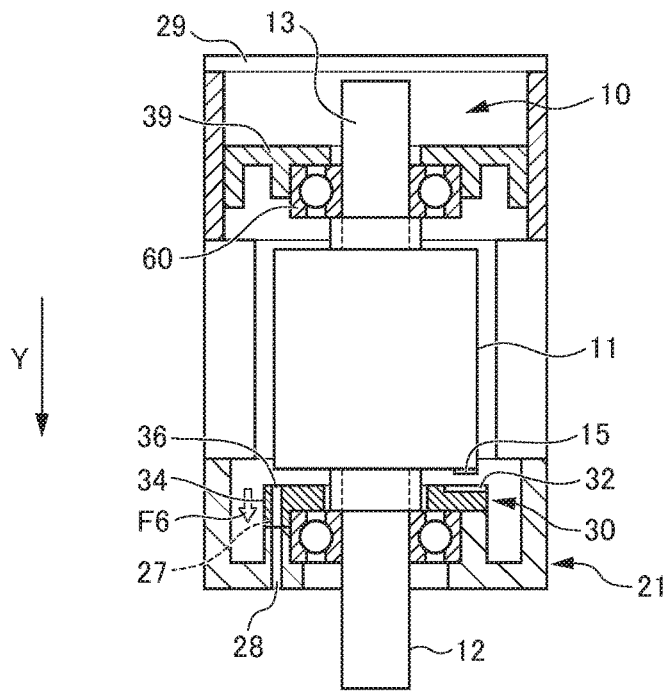
FIG. 5E illustrates a second engagement step.
Figure 5F:
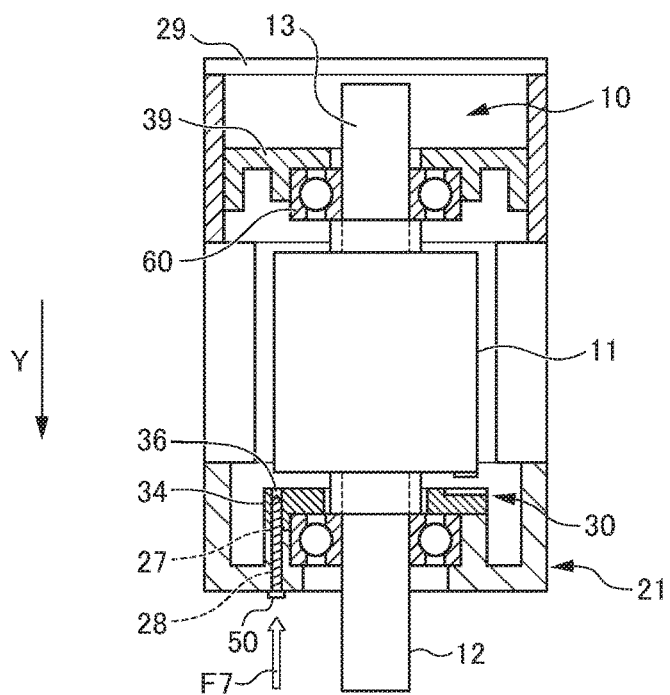
FIG. 5F illustrates a coupling step.
Figure 6A:
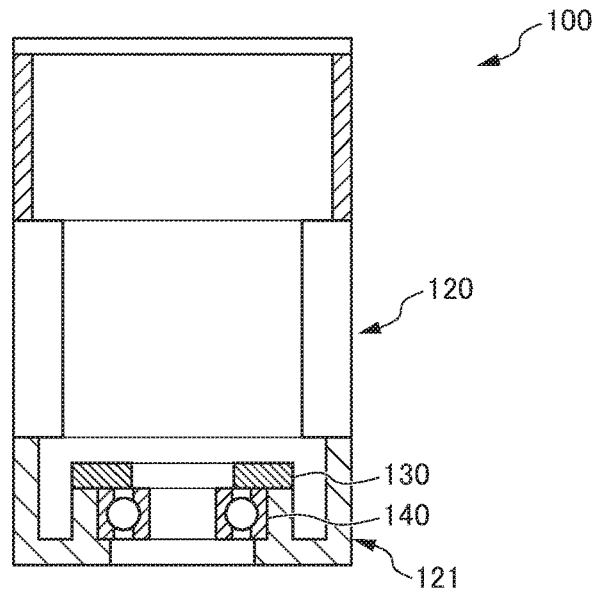
FIG. 6A illustrates a method of manufacturing a conventional motor and illustrates a step of fixing a bearing to a flange by coupling a bearing plate to the flange with a screw.
Figure 6B:
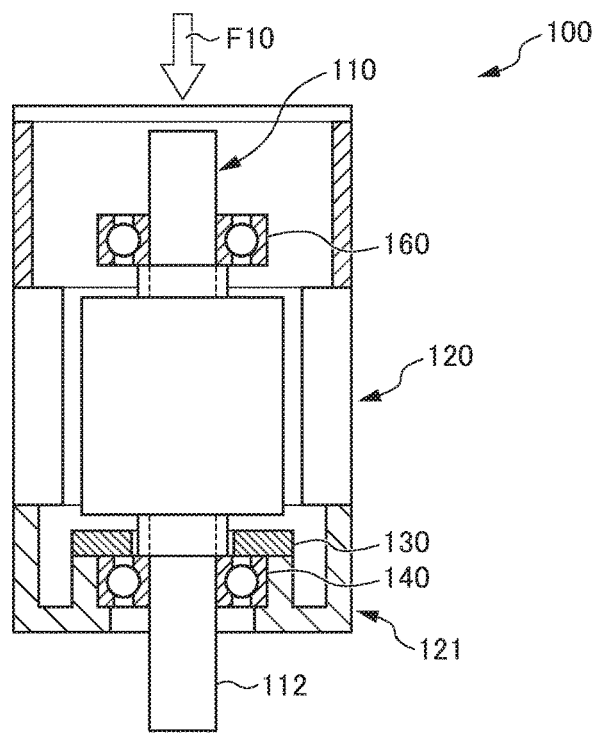
FIG. 6B illustrates the method of manufacturing the conventional motor and illustrates a step of inserting a shaft into the bearing with a press machine operated from outside, for example.
Figure 6C:
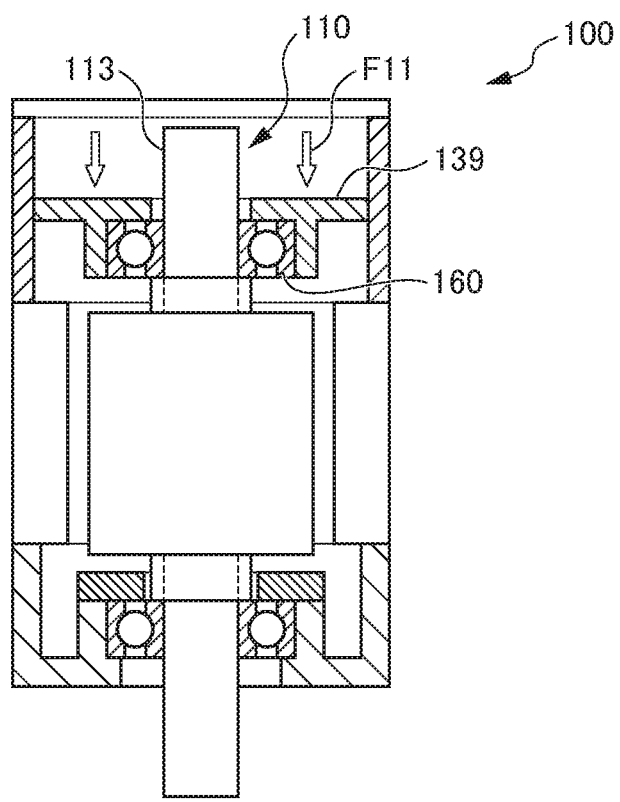
FIG. 6C illustrates the method of manufacturing the conventional motor and illustrates a step of attaching a different component.

A method of manufacturing the motor 1 of the embodiment will be described next by referring to FIGS. 5A to 5F. FIG. 5A illustrates a first insertion step. FIG. 5B illustrates a second insertion step. FIG. 5C illustrates a first rotation step and a first engagement step. FIG. 5D illustrates a second rotation step. FIG. 5E illustrates a second engagement step. FIG. 5F illustrates a coupling step.

First, as shown in FIG. 5A, in the first insertion step, a manufacturer inserts the front shaft 12 into the front bearing plate 30 and the front bearing 40 (arrow F1). More specifically, in a stage before the front bearing plate 30 and the front bearing 40 are attached to the front flange 21, the manufacturer inserts the front shaft 12 first into the front bearing plate 30 by using a press machine, for example. Then, the manufacturer inserts (press fits) the front shaft 12 further into the front bearing 40. The inner race 41 of the front bearing 40 can be held during this press fitting, so that high load is not applied to an orbital plane on the front bearing 40.

Next, as shown in FIG. 5B, in the second insertion step, the manufacturer inserts the front shaft 12 inserted into the front bearing plate 30 and the front bearing 40 into the front flange 21 (front bearing housing 26) (arrow F2). Even after the front bearing 40 is arranged in the front bearing housing 26, the second engagement part 34 is not engaged with the second engagement target part 27 as the second engagement part 34 abuts on the outer surface of the front bearing holder body 25 of the front flange 21. Pressing force required in the second insertion step for inserting the front shaft 12 into the front flange 21 is considerably lower than pressing force required in the first insertion step shown in FIG. 5A for press fitting the front shaft 12 into the front bearing 40.

Next, as shown in FIG. 5C, in the first rotation step, the manufacturer rotates the rotor body 11 about the axis direction Y (arrow F3) to move the first engagement part 15 to a position corresponding to the first engagement target part 32. Next, in the first engagement step, the manufacturer moves the rotor body 11 in the axis direction Y (arrow F4) to form engagement of the first engagement part 15 with the first engagement target part 32.

Next, as shown in FIG. 5D, in the second rotation step, while the first engagement part 15 is engaged with the first engagement target part 32, the manufacturer rotates the rotor body 11 about the axis direction Y (arrow F5) to rotate the front bearing plate 30 about the axis direction Y, thereby moving the second engagement part 34 to a position corresponding to the second engagement target part 27.

Next, as shown in FIG. 5E, in the second engagement step, the manufacturer disengages the first engagement part 15 and the first engagement target part 32 from each other and causes the second engagement part 34 to be engaged with the second engagement target part 27. In this embodiment, components including the rotor 10 are arranged so as to make the axis direction Y extend parallel to the vertical direction. Thus, the front bearing plate 30 moves in the axis direction Y (vertically downwardly) under its own weight (arrow F6), thereby automatically disengaging the first engagement part 15 and the first engagement target part 32 from each other and causing the second engagement part 34 to be engaged with the second engagement target part 27. While the second engagement part 34 is engaged with the second engagement target part 27, the first coupling hole 28 and the second coupling hole 36 communicate with each other.

Next, as shown in FIG. 5F, in the coupling step, the manufacturer inserts the coupling member 50 into the first coupling hole 28 and the second coupling hole 36 communicating with each other (arrow F7), thereby coupling the front bearing plate 30 to the front flange 21. Then, the manufacturer inserts the rear bearing 60 and the rear bearing plate 39 so as to pass the rear shaft 13 through the rear bearing 60 and the rear bearing plate 39. Then, the manufacturer attaches a cover 29, thereby manufacturing the motor 1.

This embodiment achieves effects as follows. This embodiment is capable of providing a motor with high manufacturability. More specifically, the motor 1 of this embodiment includes: the first engagement part 15 provided at the rotor body 11 to be adjacent to the front bearing plate 30; the first engagement target part 32 provided at the front bearing plate 30 to be adjacent to the rotor body 11, allowing engagement of the first engagement part 15 with the first engagement target part 32, and being separated from the first engagement part 15 in the axis direction Y; the second engagement part 34 provided at the front bearing plate 30 to be adjacent to the front flange 21; and the coupling member 50 provided at the front flange 21 to be adjacent to the front bearing plate 30 for coupling the second engagement target part 27 engaging with the second engagement part 34, the front flange 21, and the front bearing plate 30.

Thus, the front flange 21 and the front bearing plate 30 can be aligned easily by using engagement and disengagement between the engagement part and the engagement target part and by following each of the above-described steps, for example. This simplifies manufacturing process and reduces manufacturing cost. Additionally, there arises no need to use a not-versatile bearing having a particular outer shape. This can prevent cost increase caused by manufacture of such a bearing.

The rotor 10 can be inserted into the housing 20 while the front bearing 40 and the front bearing plate 30 are fitted to the front shaft 12 from outside. Thus, the inner race 41 of the front bearing 40 can be held during press fitting of the front shaft 12 into the front bearing 40. This prevents application of high load to an orbital plane on the front bearing 40, thereby reducing damage on the bearing.

In this embodiment, the first coupling hole 28 and the second coupling hole 36 are allowed to communicate with each other by causing the second engagement part 34 to be engaged with the second engagement target part 27. This eliminates the need for alignment between the first coupling hole 28 in the front flange 21 and the second coupling hole 36 in the front bearing plate 30. Additionally, working burden is reduced during the process of manufacturing the motor 1 to increase manufacturing efficiency.

It should be noted that the present invention is not limited to the above-described embodiment. Modifications, improvements, and others within a scope that can achieve the object of the present invention are certainly included in the present invention. For example, in this embodiment, the first engagement part, the first engagement target part, the second engagement part, and the second engagement target part are provided on the output side (to be adjacent to the front bearing 40). Alternatively, these parts can be provided on a side opposite the output side (to be adjacent to the rear bearing 60). The bearing holder can be formed of a member other than the flange. The movement regulation member can be formed of a member other than a member having a plate-like shape. The coupling member can be formed of a member other than a screw, as long as such a member is usable for coupling the bearing holder and the movement regulation member.

The first engagement target part may be a through part penetrating in the axis direction Y. The through part is a through hole or a cutout, for example. A relationship between the engagement part and the engagement target part in terms of a recess and a projection may be reversed from that of the embodiment. More specifically, the first engagement target part may be a projection. The first engagement part may be a recess or a through part. The second engagement target part may be a projection. The second engagement part may be a recess or a through part.

EXPLANATION OF REFERENCE NUMERALS

1 Motor
10 Rotor
11 Rotor body
12 Front shaft (shaft)
15 First engagement part
21 Front flange (bearing holder)
27 Second engagement target part
28 First coupling hole
30 Front bearing plate (movement regulation member)
32 First engagement target part
34 Second engagement part
36 Second coupling hole
40 Front bearing (bearing)
50 Coupling member
Y Axis direction

What is claimed is:
1. A motor comprising:
a rotor including a shaft arranged to extend in an axis direction and a rotor body coupled to the shaft, wherein the rotor is rotatable about the axis direction;
a bearing fitted to the shaft from outside and rotatably holding the shaft;
a bearing holder arranged on the opposite side to the rotor body with respect to the bearing so as to hold the bearing;
a movement regulation member formed in an annular shape, arranged closer to the rotor body than the bearing and separated from the rotor body, the movement regulation member having a passage hole to insert the shaft through, and a face opposing the rotor body in a state where the shaft is inserted into the passage hole, the movement regulation member regulating movement of the bearing toward the rotor body;
a first engagement part provided at the rotor body to be adjacent to the movement regulation member;
a first engagement target part provided at the movement regulation member to be adjacent to the rotor body, the first engagement target part extending inward in a radial direction from an outer edge of the movement regulation member, wherein the first engagement part can be engaged with the first engagement target part, and the first engagement target part can be separated from the first engagement part in the axis direction;
a second engagement part provided at the movement regulation member to be adjacent to the bearing holder;
a second engagement target part provided at the bearing holder to be adjacent to the movement regulation member and engaging with the second engagement part; and
a coupling member that couples the bearing holder and the movement regulation member.

2. The motor according to claim 1, wherein when the movement regulation member is not coupled to the bearing holder with the coupling member, and the second engagement part is not engaged with the second engagement target part, the movement regulation member is rotatable about the axis direction and movable in the axis direction, and
when the rotor body rotates about the axis direction while the first engagement part is engaged with the first engagement target part, the movement regulation member rotates about the axis direction by the rotation of the rotor body to allow the second engagement part to move to a position for engagement with the second engagement target part.

3. The motor according to claim 1, wherein the first engagement part is a projection projecting in the axis direction,
the first engagement target part is a recess recessed in the axis direction or a through part penetrating in the axis direction,
the second engagement part is a projection projecting in the axis direction, and
the second engagement target part is a recess recessed in the axis direction.

4. The motor according to claim 1, wherein the bearing holder includes a first coupling hole,
the movement regulation member includes a second coupling hole that is in communication with the first coupling hole when the second engagement part is engaged with the second engagement target part, and
the coupling member is inserted into the first coupling hole and the second coupling hole which are in communication with each other.

5. A method of manufacturing a motor comprising:
a rotor including a shaft arranged to extend in an axis direction and a rotor body coupled to the shaft, wherein the rotor is rotatable about the axis direction;
a bearing fitted to the shaft from outside and rotatably holding the shaft;
a bearing holder arranged on the opposite side to the rotor body with respect to the bearing so as to hold the bearing;
a movement regulation member arranged closer to the rotor body than the bearing and separated from the rotor body, the movement regulation member regulating movement of the bearing toward the rotor body;
a first engagement part provided at the rotor body to be adjacent to the movement regulation member;
a first engagement target part provided at the movement regulation member to be adjacent to the rotor body, wherein the first engagement part can be engaged with the first engagement target part, and the first engagement target part can be separated from the first engagement part in the axis direction;
a second engagement part provided at the movement regulation member to be adjacent to the bearing holder;
a second engagement target part provided at the bearing holder to be adjacent to the movement regulation member and engaging with the second engagement part; and
a coupling member that couples the bearing holder and the movement regulation member, the method comprising:
a first insertion step of inserting the shaft into the movement regulation member and the bearing;
a second insertion step of inserting, into the bearing holder, the shaft which has been inserted into the movement regulation member and the bearing;
a first rotation step of rotating the rotor body about the axis direction to move the first engagement part to a position corresponding to the first engagement target part;
a first engagement step of causing the first engagement part to be engaged with the first engagement target part;
a second rotation step of rotating the rotor body about the axis direction while the first engagement part is engaged with the first engagement target part to rotate the movement regulation member about the axis direction, thereby moving the second engagement part to a position corresponding to the second engagement target part; and
a second engagement step of disengaging the first engagement part and the first engagement target part from each other and causing the second engagement part to be engaged with the second engagement target part.

* * * * *